FACSIMILE RECORDING SYSTEM HAVING AUTOMATIC CONTRAST RANGE CONTROL

Filed Jan. 23, 1963

INVENTOR.
PETER R. MARZAN
BY E. R. Ewan
ATTORNEY

United States Patent Office 3,271,513

Patented Sept. 6, 1966

3,271,513
FACSIMILE RECORDING SYSTEM HAVING AUTOMATIC CONTRAST RANGE CONTROL

Peter R. Marzan, New City, N.Y., assignor to Litton Systems, Inc., Beverly Hills, Calif.

Filed Jan. 23, 1963, Ser. No. 253,390
8 Claims. (Cl. 178—6.6)

Figure 1:
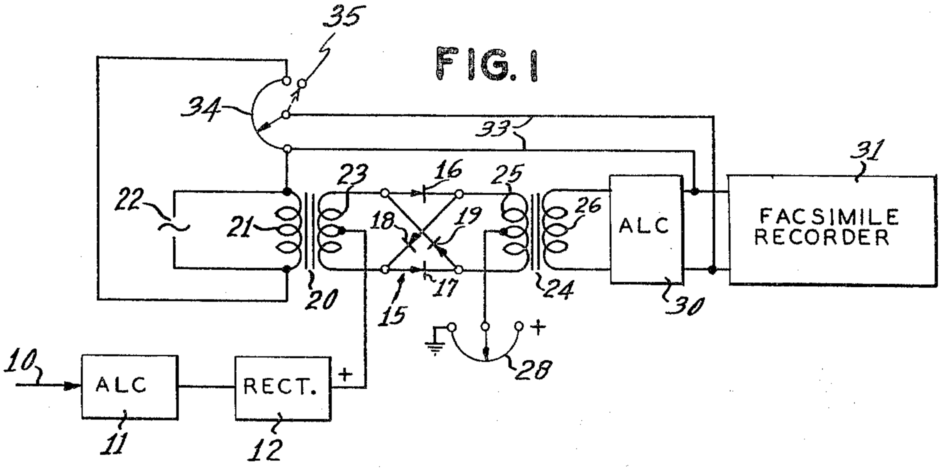

This invention relates to facsimile recording systems, and more particularly to recording systems embodying inherent signal control means to insure desired recording characteristics, for example to utilize the entire tonal response of the recording medium.

The recording medium or blank used in facsimile recording, whether light-sensitive, heat-sensitive or electrosensitive, has a definite tonal response range between the minimum or threshold signal level and the maximum usable signal level, sometimes referred to as the contrast range. Ordinarily, pictures or copy transmitted by facsimile contain both white and black areas, and it is desirable to adjust the ratio or contrast of the signals in the print or recording circuit of the recorder to utilize the entire tonal response of the recording medium. In transmitting full-tone pictures, this minimizes distortion of the recorded tones; and in transmitting black-and-white or message copy, it maintains the proper ratio between the maximum and minimum signals for optimum recording of the copy.

The contrast range of the transmitted signals may be either greater or less than the desired recording contrast range, and often varies as successive copies are received, either as a result of variations in the appearance of the subject copy, changes in the transmitter adjustment or line circuit conditions. Normally this requires frequent checking and re-adjustment of the recorder for optimum recording. It is not sufficient to adjust the gain of the recorder amplifier, since this does not set the output level at both maximum and minimum signal levels at the correct values.

The primary object of the invention, in general terms, is to provide a recording system that automatically maintains a desired signal contrast, for example corresponding to the tonal range of the recording medium, irrespective of changes in the contrast of the input signals. This obviates any necessity for manual adjustment of the recorder except for occasional setting of the gain control in case of variations in the general signal level due to line attenuation, etc.

Another object of the invention is to regulate the signal contrast in the print circuit of a facsimile recorder in such manner as to avoid degradation of the recorded copy upon the occurrence of changes in the contrast of the line signals.

A further object of the invention is to control the contrast of the signals applied to a facsimile recorder by a series of signal-modifying steps including a signal-inversion step.

With the above and other objects in view, a feature of the invention relates to a system employing a level control for the input signals whereby the maximum or white signal level is maintained constant, means for inverting the signal output of said level control whereby the white signal is converted to a constant minimum or zero level, and a second level control connected to the signal-inverting stage whereby the maximum or black signal output of said stage is held at a constant value. In this manner the contrast or signal ratio in the print circuit which is preferably adjusted to match the tonal range of the recording medium remains constant during fluctuations in the input signal contrast.

The invention, according to one embodiment to be described herein in detail, comprises means for inverting the facsimile signals, and automatic level control means for maintaining the level of the so-called black and white signals at a desired value, before and after signal inversion, respectively. Thus the ratio or signal contrast is regulated automatically, either in the case of message ("mark" and "space" signals) transmission or full-tone picture transmission. In addition, the invention may include means for changing over from positive to negative recording if desired.

Figure 2A:
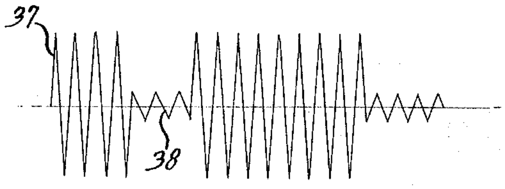
Figure 2B:
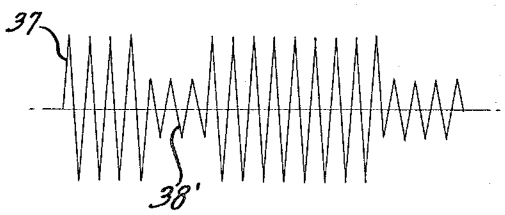
Figure 2C:
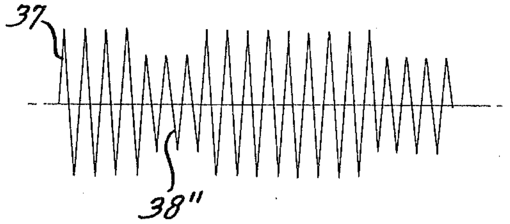

The invention, together with other objects and features thereof, will best be understood by reference to the following specification taken in conjunction with the accompanying drawings, in which FIG. 1 is a circuit diagram of a facsimile recording system embodying the invention; and FIGS. 2A, 2B and 2C are graphs representing facsimile signals of varying contrast that may be received and recorded at constant contrast in the system of FIG. 1.

Referring to FIG. 1 of the drawings, the facsimile input signals from a wire or radio channel are received on the conductor 10 connected to an automatic level control system 11 of conventional type. The level and contrast of the received signals vary, depending upon the subject copy, the adjustment of the remote transmitter, the line attenuation and other conditions. The automatic level control system 11 serves to maintain the level of the maximum or white signals constant. The gain in the ALC 11 responds to the recurrent "mark" or white pulses, in the case of message or black-and-white transmission; in the case of full-tone picture transmission, periodic control pulses may be interpersed with the picture signals for maintaining the gain in the ALC at the proper value. Arrangements for generating control pulses of constant amplitude interspersed with the transmitted intelligence signals are known in the art. A system of this character is described for example in U.S. Patent No. 2,075,898, granted April 6, 1937, to Horton and Terry.

The output signals from ALC 11 are detected or rectified in a rectifier 12, and then inverted to obtain minimum or substantially zero output level on white signals. By way of example, the signal inversion means illustrated comprises a ring modulator 15 consisting of a pair of series diodes 16 and 17, and cross-connected diodes 18 and 19 which act as switches in the manner well known in the art. The modulator further comprises an input transformer 20 having a primary winding 21 connected to a carrier source 22, and a center-tapped secondary winding 23, the mid-point tap of which is connected to the output of the rectifier 12. The modulator output transformer 24 has a center-tapped primary winding 25 and a secondary winding 26. A rheostat 28 is connected to the center tap on the winding 25 and is connected to a source of potential which opposes the potential of the signals from the rectifier 12, so that the output current from the modulator 15 may be adjusted to a desired (minimum) level for the maximum or white signals impressed upon the modulator by the rectifier 12. The inversion of the facsimile signals in this manner produces a maximum output signal level for the minimum or black signals from the rectifier 12. The secondary winding 26 of the transformer 24 is connected to a second automatic level control system 30, similar to the ALC 11, which regulates the level of the black signals and thus maintains a constant ratio or contrast between the maximum and minimum signals. In the recording system shown, the output of the ALC 30 is impressed upon the print or recording circuit of a facsimile recorder 31.

It will be understood that the references to "black" and "white" signals mean, in the case of message transmission, the "mark" and "space" signals generated by the transmitter although the automatic contrast control system described is equally effective in the case of picture transmission in which the signals represent varying shades of gray. To simplify the explanation, FIGS. 2A, B and C show message or mark and space signals of varying contrast received from the remote transmitter.

In FIG. 2A, the impulses 37 represent the maximum or white signal impulses of message transmission, and the impulses 38 represent the minimum or black signal impulses. Under different conditions, the ratio or contrast changes as shown by the relative amplitudes of the impulses 37, 38' of FIG. 2B, and the impulses 37, 38'' of FIG. 2C. The magnitude of the impulses 37 in each case is the same, since the graphs represent the output of the ALC unit 11. Therefore the signal-inversion means 15 operates to convert the maximum or white signals in each case to zero or definite minimum level, as pointed out above. The signal impulses 38, 38' or 38'', on the other hand, have larger values in the output of the signal-inversion unit 15 which are regulated to a constant amplitude by the second ALC unit 30. This results in a constant contrast between the black and white signals.

As described, the recording system provides positive recording by the facsimile recorder 31, the black signals being of maximum amplitude. If negative recording is desired in the recorder 31, a balancing signal may be connected through the conductors 33 from the carrier source 22 to oppose the current in the output circuit of the ALC unit 30, and thus invert the signals applied to the recorder 31. A rheostat 34 is provided to adjust the level of the balancing potential to the desired point. An open-circuit contact 35 is arranged at one end of the resistor of the rheostat 34, so that when the rheostat contact is turned to engage contact 35, the balancing circuit is opened and positive recording is effected.

It will be apparent that the invention provides automatic means for maintaining constant contrast in the signals applied to the print circuit of the recorder irrespective of variations in the contrast of the transmitter signals, thus assuring maximum use of the recording medium so far as tonal response is concerned and undistorted recording of the tone values of the recording. Since the contrast adjustment is effected automatically, optimum recording may be obtained with inexperienced or unskilled personnel. Correction is effected whether the transmitted signals are of greater or less contrast than desired for optimum recording and, in the case of a message or black-and-white transmission, gray or "background" recording in the white areas of the copy is avoided.

While one particular circuit has been shown and described for the purpose of explaining the underlying principles of the invention, obviously other equivalent signal-inversion and balancing means known in the art may be substituted for those illustrated in the drawing without departing from the spirit and scope of the invention.

What is claimed is:

1. A facsimile recording system comprising:
input and output signal circuits, and
a first automatic level control,
a signal-inversion circuit, and
a second automatic level control, said first automatic level control, said signal-inversion circuit and said second automatic level control being connected in series relation between said input and output signal circuits to maintain constant output signal contrast.

2. A facsimile recording system comprising:
a recorder signal input circuit for said recorder, and
means for maintaining a constant contrast or signal ratio between the maximum and minimum signals impressed on said recorder irrespective of contrast variations in the signals in said input circuit,
said means including means for rectifying the signals in said input circuit,
means for inverting the rectified signals to convert the maximum signals to signals of minimum amplitude and the minimum signals to signals of maximum amplitude, and
level control means to maintain the amplitude of the maximum signals in the output circuit of the signal-inverting means at the value corresponding to the desired contrast.

3. A facsimile recording system for converting marking and spacing signals of varying contrast or ratio into signals of constant contrast or ratio, comprising:
a signal input circuit having marking and spacing signals characterized by varying contrast or ratio,
means connected to said input circuit for rectifying said signals,
means connected to said rectifying means for inverting said signals to produce signals of maximum amplitude from the minimum or black signals in said input circuit, and to produce signals of minimum amplitude from the white signals of maximum amplitude in said input circuit, and
automatic level control means connected between said inverting means and the recorder print circuit to maintain the amplitude of said maximum signals in the output of said signal inverting means, at a constant value.

4. A facsimile recording system for converting signals of varying contrast or ratio signals of constant contrast ratio comprising:
a signal input circuit having signals characterized by varying contrast or ratio,
a modulator for converting the signals of maximum amplitude in said input circuit into signals of minimum amplitude, and for converting the signals of minimum amplitude into signals of maximum amplitude, and
automatic level control means connected to said modulator for maintaining the level of the maximum signals in the output circuit of said modulator substantially constant.

5. A facsimile recording system adapted to record marking and spacing message signals applied to the input circuit thereof, comprising:
a first automatic level control means for maintaining the maximum-amplitude message signals at a predetermined level,
inverting means connected to said level control means for inverting the message signals to convert the maximum-amplitude signals into signals of substantially zero amplitude, and to convert the minimum-amplitude signals into signals of greater amplitude, and
a second automatic level control means connected to said inverting means to limit the amplitude of the signals of greater amplitude to a predetermined value, whereby a constant amplitude ratio or contrast is obtained between the marking and spacing signals.

6. A facsimile recording system adapted to record variable-amplitude signals applied to the input circuit thereof, comprising:
a first automatic level control means connected to the input circuit for controlling the level of the maximum-amplitude signals to maintain the output level at a constant value,
inverting means connected to said first level control means for inverting the message signals, and
a second automatic level control means connected to said inverting means to limit the amplitude of the signals of greater amplitude from the inverting means to a predetermined value, whereby a constant amplitude ratio or contrast is obtained between the maximum and minimum signals.

7. A facsimile recording system adapted to record facsimile signals at a constant contrast comprising:
input and output signal circuits,
a first automatic level control means connected to the input circuit for controlling the level of the maximum-amplitude signals to maintain the level at a constant value, and means for maintaining a constant contrast or ratio between the output signals to be applied to the print circuit of the recording system, said last-mentioned means including serially connected signal-inverting means and a second automatic level control means.

8. A facsimile recording system adapted to record marking and spacing message signals applied to the input circuit thereof comprising:

means for inverting the amplitude characteristic of the marking and spacing signals, said means including a carrier source and a signal modulator connected to said input circuit, level control means for regulaitng the amplitude of the signals of maximum amplitude before and after said signal inversion and a balancing circuit including said carrier source connected to the output of said modulator circuit to supply out-of-phase voltage to the recorder input to reverse the recording from positive recording to negative recording.

References Cited by the Examiner

UNITED STATES PATENTS

| | | | |
|---|---|---|---|
| 2,363,813 | 11/1944 | Somers | 178—7.3 |
| 2,542,152 | 2/1951 | McConnell | 178—7.3 |
| 2,673,891 | 3/1954 | Jones | 178—6.6 |

DAVID G. REDINBAUGH, *Primary Examiner.*

H. W. BRITTON, *Assistant Examiner.*

UNITED STATES PATENT OFFICE

CERTIFICATE OF CORRECTION

Patent No. 3,271,513 September 6, 1966

Peter R. Marzan

It is hereby certified that error appears in the above numbered patent requiring correction and that the said Letters Patent should read as corrected below.

Column 4, line 27, for "ratio signals" read -- ratio into signals --; same line 27, after "contrast" insert -- or --; column 5, line 16, for "regulaitng" read -- regulating --.

Signed and sealed this 1st day of August 1967.

(SEAL)
Attest:

EDWARD M. FLETCHER, JR.
Attesting Officer

EDWARD J. BRENNER
Commissioner of Patents